United States Patent
Beyerlein et al.

[15] 3,680,655
[45] Aug. 1, 1972

[54] ELECTRICAL WHEEL SLIP LIMITING APPARATUS

[72] Inventors: David G. Beyerlein; Douglas W. Sweet, both of Flint, Mich.

[73] Assignee: General Motors Corporation, Detroit, Mich.

[22] Filed: July 6, 1970

[21] Appl. No.: 52,637

[52] U.S. Cl. .................. 180/54 R, 180/105 E, 317/5
[51] Int. Cl. ............................................. B60k 31/00
[58] Field of Search ........ 180/54, 77, 105, 64; 317/5

[56] References Cited

UNITED STATES PATENTS

| | | | |
|---|---|---|---|
| 3,060,602 | 10/1962 | Buttenhoff | 180/105 R X |
| 3,356,082 | 12/1967 | Jukes | 180/105 E UX |
| 3,042,836 | 7/1962 | Hamilton et al. | 317/5 |
| 3,153,746 | 10/1964 | Atkinson | 317/5 |

Primary Examiner—Benjamin Hersh
Assistant Examiner—Milton L. Smith
Attorney—Jean L. Carpenter, Paul Fitzpatrick and Warren D. Hill

[57] ABSTRACT

Maximum traction of a vehicle during acceleration is assured by a circuit responsive to signals from driven and non-driven wheel transducers including a frequency comparator for determining the difference in wheel speeds, a variable duty cycle oscillator controlled by the wheel speed difference and a switching circuit in the vehicle engine ignition system responsive to the oscillator output to periodically interrupt engine ignition by an amount proportional to the wheel speed difference so that as excessive slipping of the driven wheels occurs the engine torque output is reduced to limit the wheel slip.

3 Claims, 2 Drawing Figures

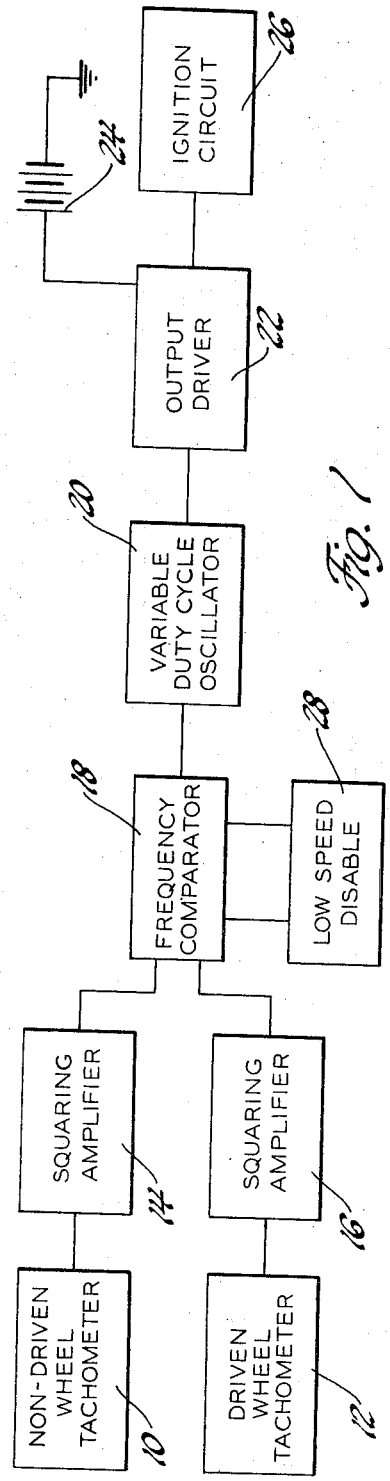
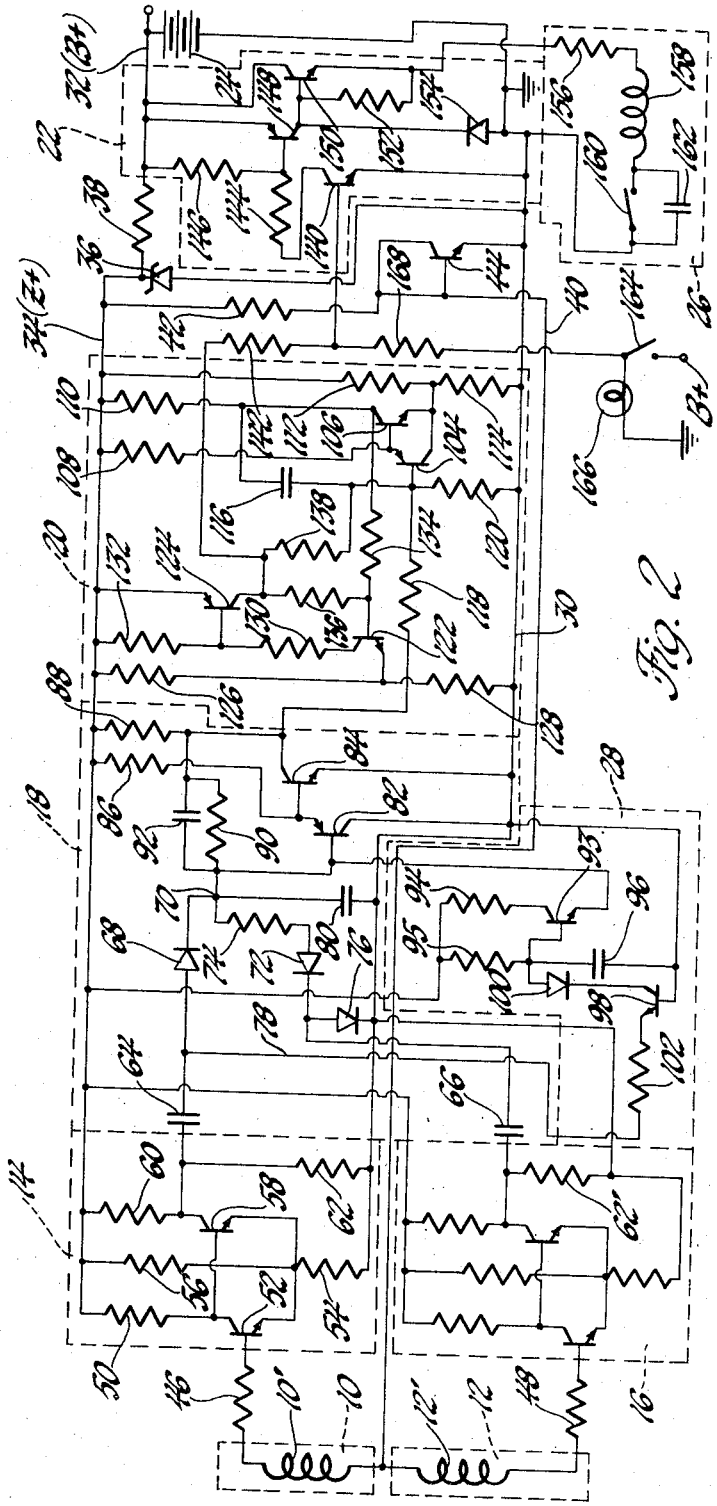

ELECTRICAL WHEEL SLIP LIMITING APPARATUS

This invention relates to a wheel slip limiting apparatus and more particularly to such an apparatus which includes an electrical control for limiting wheel input torque.

It is a common experience with automotive vehicles for excessive wheel slip or spinning to occur during vehicle acceleration. This happens when the operator causes an extremely high engine torque to be delivered to the driven wheels such that the frictional forces between the tire and the road are overcome. In the event that the road surface is slippery a moderate engine torque can cause such slipping. While a small amount of slip between the tire and road surface is necessary to achieve a driving force, an excessive slip results in a reduction of effective driving force or traction.

It is, therefore, a general object of the invention to provide maximum traction during vehicle acceleration by a completely electrical apparatus for limiting the engine torque being produced when a driven wheel slips excessively.

It is a further object of the invention to reduce engine torque during wheel slipping by an amount proportional to the excessive wheel slip.

It is a further object of the invention to control excessive slip of any driven vehicle wheel by periodically interrupting the engine ignition to an extent determined by the amount of excess wheel slip.

The invention is carried out by providing an electrical control including a driven wheel transducer and a non-driven wheel transducer to generate signals proportional to the respective wheel speeds, a circuit for comparing the speed signals and providing an output representing excessive slip of the driven wheel and an electrical circuit including a variable duty cycle oscillator responsive to the wheel slip signal to reduce engine torque to an extent determined by the wheel slip.

The invention further contemplates a variable duty cycle oscillator responsive to the wheel slip signal which provides an output effective to periodically open the engine ignition circuit for time periods which vary according to the amount of wheel slip.

The above and other advantages of the invention will become apparent in the following description taken in conjunction with the drawings wherein like reference numerals refer to like parts and wherein:

FIG. 1 is a block diagram of the electrical control circuit according to the invention; and, FIG. 2 is a schematic circuit diagram of the control circuit of FIG. 1.

During vehicle acceleration slipping between the driven wheels and the road surface is always present; otherwise no tractive force would be developed. The amount of slip increases as driving torque applied to the wheels increases until the wheel traction reaches maximum and thereafter traction decreases with further increase of wheel slip. The point of maximum traction varies according to road conditions. However, a representative value of 10 percent slip generally corresponds with maximum traction. The term "wheel slip" as used herein, is defined as wheel slip = ($W_d$ − $W_n/W_n$ × 100 wherein $W_n$ is the speed of a non-driven wheel and $W_d$ is the speed of a driven wheel. The term "excessive wheel slip" as used herein means the amount of wheel slip in excess of that required for maximum traction.

The purpose of the apparatus of this invention is to limit the engine torque applied to the driven wheels when the wheel slip exceeds a predetermined value such as 10 percent, and to proportionately reduce the engine torque according to the amount by which the wheel slip exceeds the predetermined optimum value.

Referring to FIG. 1 the apparatus includes a non-driven wheel tachometer 10 and a driven wheel tachometer 12. These tachometers may be of any type suitable for sensing the speeds of wheel rotation but preferably are of toothed wheel variable reluctance electromagnetic transducers including an output coil producing a generally sinusoidal signal having a frequency proportional to wheel rotation speed. In a conventional automobile a non-driven wheel tachometer 10 is located to directly sense the speed of a non-driven front wheel and the driven wheel (e.g., 12 is preferably arranged to sense the rotation of the vehicle propeller shaft which drives rear wheels. The tachometers 10 and 12 are designed with different numbers of teeth so that they will produce equal frequencies for equal driven and non-driven wheel speeds even though the driven wheel tachometer senses propeller shaft speed which differs by a fixed ratio from the driven wheel speed. If desired, the number of teeth in the sensors may be made equal and the ratio compensated for electronically. The outputs of the tachometers 10 and 12 are fed to squaring amplifiers 14 and 16 respectively which produce square waves corresponding in frequency to the tachometer outputs. The squaring amplifier 14 is adjusted to have a current output about 10 percent greater than that of the amplifier 16 so as to compensate for the normal 10 percent wheel slip occurring during maximum traction conditions.

The squaring amplifier outputs are fed to a comparator 18 which produces a DC output signal corresponding to the amount by which the average current of the amplifier 16 exceeds the average current of the amplifier 14. It is thus apparent that the comparator output is proportional to the excessive slip of the driven wheel. Since the squaring amplifier 14 has a higher current output than the output of amplifier 16 at equal wheel speeds the comparator output will remain at zero until the driven wheel slip exceeds that required for maximum traction, or about 10 percent slip. The output of the comparator 18 then is proportional to the excessive wheel slip.

A variable duty cycle oscillator 20 is connected to the output of the frequency comparator which produces a square wave output having a duty cycle proportional to the output of the comparator 18. An output driver 22 provides a high power level switching function corresponding to the duty cycle generated by the oscillator 20. A vehicle battery 24 is connected through the output driver 22 to the engine ignition circuit 26. The output driver is so arranged that normally current is supplied from the battery 24 to the ignition circuit 26 without interruption. In the event a small excessive wheel slip occurs the variable duty cycle oscillator 20 produces low duty cycle output pulses which causes the output driver 22 to periodically interrupt the ignition circuit 26 for brief periods to slightly decrease the engine output. In the event a larger excessive wheel slip occurs the interruption of the ignition circuit becomes proportionately larger until at some extreme value of excessive wheel slip the duty cycle approaches 100 percent and the ignition circuit 26 is completely disabled. By interrupting the ignition circuit periodically on a duty cycle basis, the engine output is smoothly lowered so that the effects are not noticable to occupants of the vehicle yet at the same time torque to the driven wheels is reduced to minimize excessive wheel slip and thereby maintain maximum traction between the driven wheels and the road surface.

An optional feature comprising a low speed disabling circuit 28 is connected to the frequency comparator for sensing the speed of the non-driven wheels to disable the frequency comparator at low speeds, say below 2 mph. The advantage of this provision is that it prevents engine stalling during excessive slip at low engine speeds such as may occur, for example, when the vehicle is being rocked in an attempt to extricate it from a snow bank.

The details of the circuit are set forth in FIG. 2. The circuit includes a grounded conductor 30, a B+ power line 32 connected to the battery 24 and a voltage regulated Z+ line 34. To effect the voltage regulation the line 32 is connected to the line 34 through a voltage dropping resistor 38 and a Zener diode 36 is connected between the line 34 and ground. This maintains the Z+ potential at 8.2 v. A second voltage regulated line 40 having a potential of about one-half volt is provided by a resistor 42 and a transistor 44 serially connected between Z+ and ground. The collector and base of the transistor 44 are tied together and directly connected to the line 40 so that the transistor 44 functions as a diode and the line 40 consequently is held at a voltage above ground equal to the diode drop across the transistor 44. The non-driven wheel tachometer 10 and the driven wheel tachometer 12 each include an output coil 10' and 12' respectively. Each coil has one end connected to the regulated line 40 and the other end connected to a squaring amplifier 14 or 16 through limiting resistors 46 or 48.

The squaring amplifier 14 is basically a Schmitt trigger provided with hysteresis. A resistor 50 is connected between Z+ and the collector of a transistor 52. The transistor emitter is connected through a small bias resistor 54 to ground. A calibrating resistor 56 is connected between Z+ and the resistor 54. The calibrating resistor 56 is selected to provide a nominal bias on the emitter of about 0.1 volt. A second transistor 58 has its base connected to the collector of the transistor 52, its collector connected through a load resistor 60 to Z+ and its emitter connected to the emitter of the transistor 52. A voltage dividing resistor 62 is connected between the collector of transistor 58 and ground. With this arrangement when there is no signal induced in the coil 10', the transistor 52 is biased "off" so that the transistor 58 is driven to saturation. Then a signal of at least 0.1 volt must be produced across the coil 10' to change the state of the amplifier 14 and a coil voltage of −0.1 volt is necessary to return the amplifier to its initial state. This hysteresis is effective to eliminate the effects of low voltage noise in the coil 10'.

The structure and operation of the squaring amplifier is the same as the amplifier 14 except that the resistor 62' has a value somewhat different from that of the resistor 62. Those resistors are selected to permit larger current output pulses from the amplifier 14 to compensate for the normal desired slip of the driven wheel.

The comparator circuit 18 has series capacitors 64 and 66 in its two inputs. Capacitor 64 is connected to the output of the squaring amplifier 14 and to a diode 68 which is poled to conduct current toward a summing point 70. The capacitor 66 is connected to the output of the amplifier 16 and to a diode 72 which is poled to conduct current from the summing point 70 and through a resistor 74. The resistor 74 introduces a non-linearity into the comparator to modify the average current in diode 72 with wheel speed. A diode 76 is connected between the capacitor 66 and ground. A conductor 78 extends from the capacitor 64 to the disabling circuit 28 to provide a discharge path for that capacitor. A filter capacitor 80 is connected between the summing point 70 and ground. An operational amplifier, including a PNP transistor 82 and an NPN transistor 74, forms the output of the comparator circuit. The base of the transistor 82 is connected to the junction point 70, the collector is grounded and its emitter is connected through a resistor 86 to the Z+ line. The transistor 84 has its base connected to the emitter of the transistor 82 and its emitter is grounded. The collector is connected through a load resistor 88 to Z+. A feedback resistor 90 connected between the collector of transistor 84 and the base of transistor 82 establishes the gain of the operational amplifier. A capacitor 92, across the resistor 90, furnishes a filtering action.

In operation when the transistor 58 is turned off, high voltage will be applied to the capacitor 64 so that a charging current pulse is passed by the capacitor 64 through the diode 68 to the summing point 70. When the transistor 58 conducts the capacitor 64 will discharge by way of the disabling circuit 28, the conductor 78, transistor 58 and the resistor 54 to ground. In the same manner the square wave pulses applied to the capacitor 66 by the amplifier 16 will charge the capacitor 66 through the diode 76 to ground and the capacitor 66 discharge will cause current flow from the junction point 70 through resistor 74 and the diode 72. In effect the current through the diode 72 is substracted from the current through the diode 68. When the current through the diode 68 is equal to or greater than the current through the diode 72 the operational amplifier will be biased to saturation, that is, the base of the transistor 82 will have sufficiently high voltage relative to the emitter that the transistor 82 will be held "off" and the transistor 84 then will be driven to saturation and the collector of transistor 84 will then be held at about one-fourth volt, the saturation voltage of transistor 84. When, however, the current through the diode 72 exceeds the current through the diode 68 and the base of the transistor 82 tends to decrease in voltage, the transistor 82 will begin to conduct and the transistor 84 will become less conductive so that its collector voltage will linearly increase in value proportional to the difference in the diode currents which is nearly proportional to the amount of excessive wheel slip subject to the non-linearity caused by the resistor 74. The non-linearity decreases the sensitivity of the control as wheel speed increases.

The low speed disabling circuit 28 comprises a transistor 93 having its emitter connected to the base of transistor 82 and its collector connected through a load resistor 94 to Z+. A bleed resistor 95 is connected between Z+ and the base of the transistor 93 and a large capacitor 96 is connected from the base of transistor 93 to ground. A transistor 98 has a grounded base and its collector connected through a diode 100 to the base of the transistor 93 and its emitter connected through a resistor 102 to the conductor 78. When the capacitor 64 discharges, as previously described, discharge current flows through the capacitor 96, diode 100, transistor 98 and resistor 102 thereby tending, at high speeds, to depress the base of the transistor 93 to a very low voltage so that the transistor 93 will be cut-off. However, at very low speeds, e.g., 2 mph), of a non-driven wheel, very little current will be drawn through the diode 100 and the current flowing through the bleed resistor 95 to the capacitor 96 will exceed the current drawn through diode 100 so that the potential at the base of the transistor 93 increases enough to turn on the transistor 93 to furnish a large current to the base of the transistor 82 which turns off the latter irrespective of the relative currents through the diodes 68 and 72 thereby completely disabling the control circuit and preventing interruption of the ignition system.

The variable duty cycle oscillator 20 comprises an integrator in conjunction with a flip-flop circuit. The integrator incorporates an operational amplifier comprising transistors 104 and 106 and resistors 108 and 110 arranged the same as the operational amplifier in the comparator 18. A voltage divider between Z+ and ground comprising resistors 112 and 114 is connected at the resistor midpoint to the emitter of the transistor 106 to provide biasing for the operational amplifier. A capacitor 116 between the collector of the transistor 106 and the base of the transistor 104 provides an integrating function. An input resistor 118 connects the base of the transistor 104 to the collector of the transistor 84 in the comparator and a resistor 120 is connected between the base of transistor 104 and ground. The flip-flop circuit includes transistors 122 and 124. Biasing of the flip-flop circuit is provided by a voltage divider comprising resistors 126 and 128 serially connected between Z+ and ground with their junction connected to the emitter of the transistor 122. The collector of the transistor 122 is connected by resistors 130 and 132 to Z+ while the transistor base is connected through resistor 134 to the collector of the transistor 106. The transistor 124 has its emitter connected to Z+, its base connected to the junction of resistors 130 and 132 and its collector connected through a regenerative feedback resistor 136. The collector of transistor 124 is also connected by a feedback resistor 138 to the base of the transistor 104. In operation, when there is no excessive slip, the transistor 84 is on to impress a low voltage on its collector. The transistor 104 is held in a high conductive level, the transistor 106 is at a low conductive level and its collector is at a high potential. Thus, the transistors 122 and 124 are saturated and a high potential, essentially Z+, is present at the collector of the transistor 124 which forms the output point of the duty cycle oscillator. In this state current is fed through the feedback resistor 138 to the base of the transistor 104. That current is withdrawn from the base of transistor 104 through the resistors 120 and 118. In this condition, the output of the oscillator 20 is turned fully on which represents a 0 percent duty cycle. When excessive slip occurs, the voltage at the collector of the transistor 84 increases so that the transistor 104 becomes less conductive, the transistor 106 becomes more conductive and the voltage at its collector decreases at some rate which depends on the amount of excessive slip. When the voltage on the collector of transistor 106 reaches a value determined by the bias on the emitter of transistor 122 and the current supplied through the feedback resistor 136, the transistors 122 and 124 turn off so that the voltage at the oscillator output drops to a very low value and the current through the feedback resistor 138 reverses. With the feedback current removed, the integrator voltage at the collector of the transistor 106 begins to increase until the flip-flop circuit becomes conductive again and the cycle repeats. The current through the regenerative feedback resistor 136 and the resistor 134 provides a hysteresis which in combination with divider network 126 and 128 determines the trigger points of the flip-flop circuit. Thus the variable duty oscillator 20 comprises an integrator producing a triangle waveform output which at its extremes, triggers a flip-flop circuit to produce a square wave output having a duty cycle dependent upon the input voltage applied to the resistor 118.

The output driver 22 comprises a transistor 140 having its base connected through a resistor 142 to the output of the duty cycle oscillator 20, its emitter connected to ground and its collector connected through resistors 144 and 146 to B+. A transistor 148 has its base connected to the junction of resistors 144 and 146, its emitter connected to B+ and its collector connected to the base of an output transistor 150. The collector of the transistor 150 is connected to B+ and its emitter is connected to the ignition circuit 26. A resistor 152 interconnects the base and emitter of the transistor 150. A spike quenching diode 154 is connected between ground and the collector of transistor 148.

The ignition circuit 26 is conventional. The portion shown on the drawing is only the primary circuit which includes in series a resistor 156, a primary coil 158 and breaker points 160 connected between the output driver 22 and ground. A condenser 162 is connected across the breaker points. During normal operation, the voltage at the collector of the transistor 124 is high so that the transistors 140, 148 and 150 are turned on. Then the B+ potential is applied through the transistor 150 to the ignition circuit 26. In the event of excessive wheel slippage, if the collector of the transistor 124 assumes a low potential, the transistors 140, 148 and 150 will be turned off to thereby interrupt current flow to the ignition circuit 26, the period of interruption depending upon the amount of excessive wheel slip. As the variable duty cycle oscillator produces output pulses, the ignition circuit will be periodically interrupted to smoothly decrease engine torque, thereby allowing the driven wheel to slow to a normal slip to achieve maximum traction.

There is a feature to insure there is no interruption of the ignition circuit while the vehicle brakes are being applied. Brake switch 164 which connects B+ to a brake signal lamp 166 also connects B+ through a resistor 168 to the base of the transistor 140 so that whenever brakes are applied, the output driver 22 is biased on irrespective of the operation of the duty cycle oscillator 20. This feature is desirable since during braking, variations in relative wheel speeds produce a false indication of wheel slip which could cause the duty cycle oscillator to oscillate.

The embodiment of the invention described herein is for purposes of illustration and the scope of the invention is intended to be limited only by the following claims.

It is claimed:

1. In a vehicle having an engine, a wheel driven by the engine and a non-driven wheel, the driven wheel being liable to slipping in excess of that required for maximum traction in the event excessive torque is applied thereto by the engine, apparatus for limiting excessive slipping of the driven wheel comprising first detector means responsive to the speed of the driven wheel for producing an electrical signal as a function of driven wheel speed, second detector means responsive to the speed of the non-driven wheel for producing an electrical signal as a function of non-driven wheel speed, comparator means responsive to the electrical signals for producing an excessive wheel slip signal as a function of the amount the driven wheel speed exceeds the non-driven wheel speed, a variable duty cycle oscillator responsive to the excessive wheel slip signal, and means associated with the engine and responsive to the oscillator for reducing engine torque by an amount dependent on the wheel slip signal.

2. In a vehicle having an engine, a wheel driven by the engine and a non-driven wheel, the driven wheel being liable to slipping in excess of that required for maximum traction in the event excessive torque is applied thereto by the engine, apparatus for limiting excessive slipping of the driven wheel comprising first detector means responsive to the speed of the driven wheel for producing an electrical signal as a function of driven wheel speed, second detector means responsive to the speed of the non-driven wheel for producing an electrical signal as a function of non-driven wheel speed, one of the electrical signals being compensated to equalize the electrical signals when sufficient wheel slip occurs to provide maximum traction, comparator means responsive to the electrical signals for producing an excessive wheel slip signal proportional to the amount the driven wheel speed signal exceeds the non-driven wheel speed signal, a variable duty cycle oscillator responsive to the excessive wheel slip signal having an output duty cycle proportional to excessive wheel slip, and means associated with the engine and responsive to the oscillator for reducing engine torque by an amount dependent on the excessive wheel slip signal.

3. In a vehicle having an engine provided with an ignition circuit, a wheel driven by the engine and a non-driven wheel, the driven wheel being liable to slipping in excess of that required for maximum traction in the event excessive torque is applied thereto by the engine, apparatus for limiting excessive slipping of the driven wheel comprising first detector means responsive to the speed of the driven wheel for producing an electrical signal as a function of driven wheel speed, second detector means responsive to the speed of the non-driven wheel for producing an electrical signal as a function of non-driven wheel speed, one of the electrical signals being compensated to equalize the electrical signals when sufficient wheel slip occurs to provide maximum traction, comparator means responsive to the electrical signals for producing an excessive wheel slip signal proportional to the amount the driven wheel speed signal exceeds the non-driven wheel speed signal, a variable duty cycle oscillator responsive to the excessive wheel slip signal having an output duty cycle proportional to excessive wheel slip, and circuit means connecting the variable duty cycle oscillator to the ignition circuit for periodically interrupting the ignition circuit for periods proportional to the excessive wheel slip signal to reduce engine torque according to the amount of excessive wheel slip.

* * * * *